July 7, 1964

D. W. BINGHAM 3,139,914

SYRUPING APPARATUS FOR USE IN CONNECTION WITH THE CANNING
OF FRUIT, VEGETABLES AND OTHER FOOD PRODUCTS

Filed Nov. 30, 1961

INVENTOR
DAVID W. BINGHAM

BY *Imirie and Smiley*
ATTORNEYS

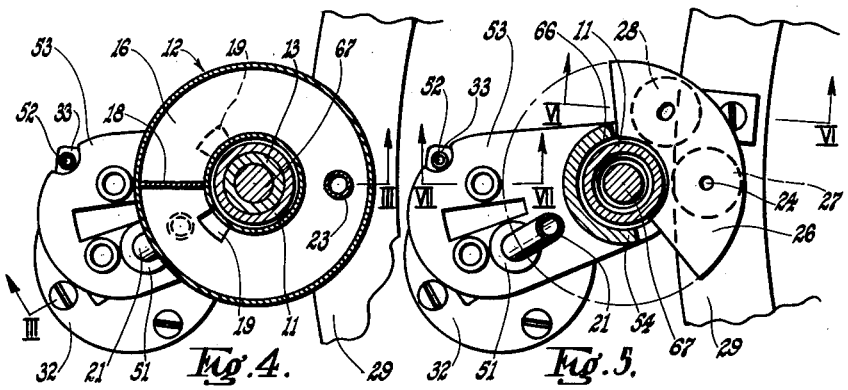
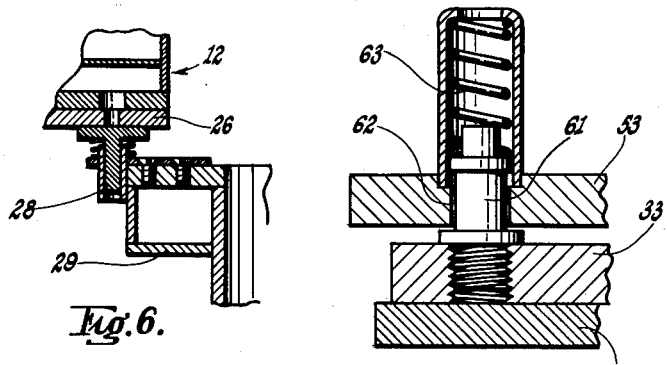
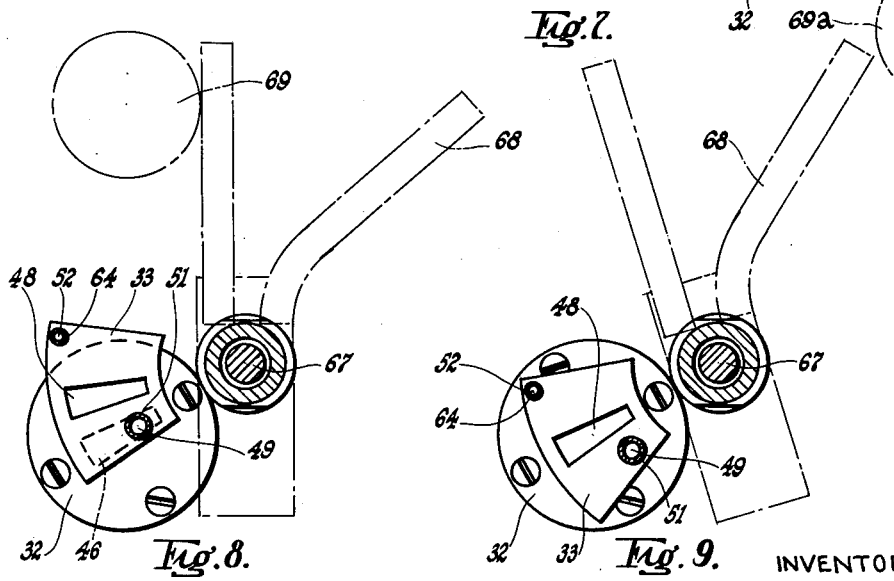

July 7, 1964

D. W. BINGHAM 3,139,914

SYRUPING APPARATUS FOR USE IN CONNECTION WITH THE CANNING
OF FRUIT, VEGETABLES AND OTHER FOOD PRODUCTS

Filed Nov. 30, 1961

INVENTOR
DAVID W. BINGHAM

BY Finnie and Finley
ATTORNEYS

United States Patent Office 3,139,914
Patented July 7, 1964

3,139,914
SYRUPING APPARATUS FOR USE IN CONNECTION WITH THE CANNING OF FRUIT, VEGETABLES AND OTHER FOOD PRODUCTS
David William Bingham, Brighton, Victoria, Australia, assignor to D. W. Bingham and Company Proprietary Limited, Victoria, Australia, a corporation of Victoria
Filed Nov. 30, 1961, Ser. No. 156,106
Claims priority, application Australia Nov. 30, 1960
11 Claims. (Cl. 141—45)

This invention relates to vacuum syruping apparatus for use in connection with the canning of fruit, vegetables and other food products prior to the closure of the cans and subsequent cooking of the contents. Such apparatus includes means whereby a partial vacuum is created in each can for removing most of the air therein and at the same time, inducing the syrup or brine to flow into the can.

By this arrangement undesirable trapping of air, for example, under halved peaches is reduced to a minimum. However, a further difficulty has previously been experienced in that when each can was filled with syrup and syrup continued to enter the can, the excess syrup was necessarily drawn off through the vacuum passages and this necessitated the provision of a common separator for removing such excess liquid from the passages leading to the source of vacuum.

This old method of vacuum syruping usually involved a relatively large withdrawal of such excess liquid and its return to the main bowl after having been separated from the air stream flowing to the vacuum pump. Fruit particles were frequently carried over with the excess syrup and, consequently, caused an undesirable cloudiness of the main syrup supply.

Still another objectionable feature of this old method was that if the air was withdrawn from the can through the liquid at a speed greater than a predetermined maximum, foaming of the syrup resulted and separation of liquid globules from the air stream was most difficult unless a relatively large volume separator was employed.

In most cases where air under atmospheric pressure was employed to force the syrup into the can, it was not possible to let the air in too rapidly or it would tend to pass through the turbulent inflowing body of liquid and enter the can without achieving the object of forcing the syrup into the fruit contained in the can. Consequently, the speed at which such old methods of vacuum syruping could be carried out, was necessarily limited.

The primary object of the present invention is to provide improved apparatus of the kind indicated which is adapted to function in such a manner that the syrup is not admitted to each can until after the can has been subjected to a partial vacuum and the vacuum passages closed with the result that there is no carry-over of excess syrup into the main passages leading to the source of vacuum.

The improved apparatus enables syrup or other liquid of any suitable temperature to be employed whilst at the same time the possibility of undesirable foaming of the liquid occurring is either eliminated or at least reduced to a minimum.

An important feature of the invention is that the improved apparatus includes a series of improved filling heads each of which is adapted to trap any condensate or moisture in the outgoing air stream from each can and to automatically return such condensate to the main bowl.

Another object is to provide in apparatus of the kind indicated improved no can, no fill mechanism which is of particularly simple design and construction and is devoid of springs.

The improved filling heads and related no can, no fill mechanism are of simple design and relatively inexpensive construction and are adapted to operate in such a manner that the vacuum syruping apparatus is capable of running at relatively high speeds of upwards, for example, of 300 cans per minute. The control valves in the filling heads include a minimum number of parts which are not likely to get out of order or require frequent maintenance. In addition, the trapped excess liquid is automatically returned to the main supply bowl.

In accordance with the present invention an improved vacuum syruping apparatus of the kind indicated comprises a main supply bowl for syrup or other liquid carrying a series of circumferentially spaced filling heads located within the bowl so as to project through the bottom thereof and having associated vacuum and liquid control valve assemblies immersed in the liquid when the latter is contained in the bowl which is located above a series of circumferentially spaced platforms adapted to receive cans to be filled with said liquid and a vacuum pump for creating a partial vacuum in each can so as to cause liquid from the bowl to enter the can under atmospheric pressure, each filling head having means for automatically closing a vacuum passage in said valve assembly prior to admitting the liquid to the can, each filling head having an independent liquid separator associated therewith for trapping any liquid that may be entrained in the outflowing air stream passing to said vacuum pump.

Other objects and various novel characteristic features of the invention will be more readily apparent from the following detailed description which refers by way of example to the application of the invention to apparatus for introducing syrup into canned fruit.

It is to be understood, however, that the invention is not limited to such apparatus but that it is equally capable of being used for example in connection with the supply of brine to canned vegetables.

Referring to the drawings which form part of this specification:

FIGURE 4 is a sectional plan taken on the line IV—IV of FIGURE 3;

FIGURE 5 is a sectional plan taken on the line V—V of FIGURE 3;

FIGURE 6 is a fragmentary sectional elevation taken on the line VI—VI of FIGURE 5 and showing a drain valve associated with each filler head;

FIGURE 7 is an enlarged sectional elevation showing the spring means employed for maintaining close engagement between fixed and movable valve plates employed in each filling head;

FIGURE 8 is a semi-diagrammatic plan view showing the valve plates and the striker arms of related no can, no fill mechanism in their inoperative or no fill positions;

FIGURE 9 is a similar view to FIGURE 8 but showing the parts mentioned in their operative position for filling a can;

Figure 1:
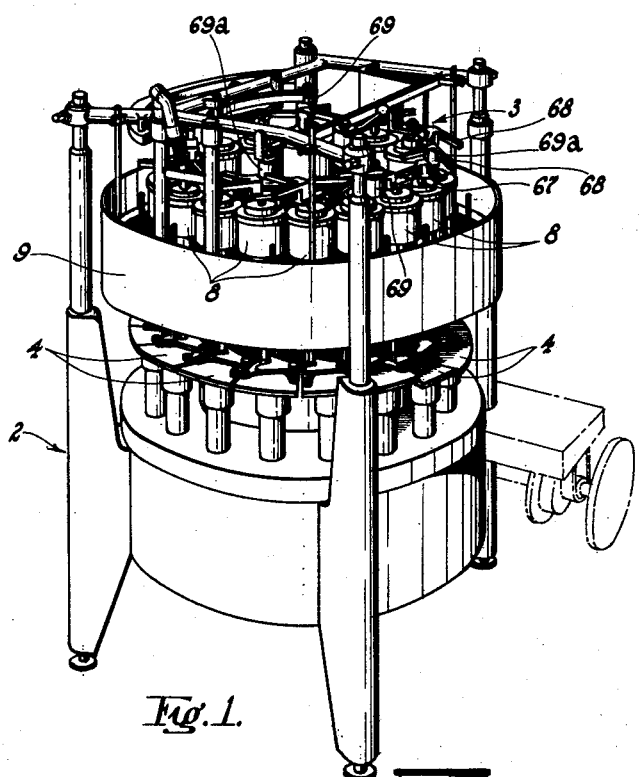
FIGURE 1 is a perspective view of a vacuum syruping apparatus in accordance with the present invention.
Figure 2:
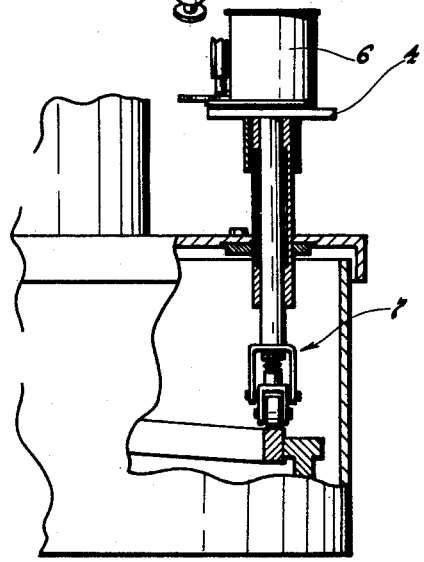
FIGURE 2 is a fragmentary sectional elevation on an enlarged scale showing elevating mechanism for each of the can platforms.

A vacuum syruping machine to which the invention is particularly applicable includes a supporting structure 2 having an upstanding central standard carrying mounting means for can filling mechanism 3 which is located above a series of circumferentially spaced can platforms 4 as seen in FIGURE 1.

The latter are adapted to be fed with cans 6 from any suitable type of conveyor, elevating mechanism 7 being employed for raising and lowering each platform and the can thereon in relation to its respective filling head 8.

The can filling mechanism and the series of associated can platforms 4 are adapted to be rotated in relation to the supporting structure and during such rotary movement each can is raised into engagement with its filling head and filled with syrup or other liquid before it is lowered and removed by any suitable means.

An electric motor and any suitable gearing or other driving mechanism may be provided for rotating the can filling mechanism 3 and the parts associated therewith and actuating the various parts of the series of filling heads 8 and aforesaid elevating mechanism 7 in synchronism.

The can filling mechanism includes a main supply bowl 9 for the syrup or other liquid and carries a series of the filling heads which are located inside the bowl and circumferentially spaced with their associated valve mechanism hereinafter described immersed in the syrup or other liquid.

Figure 3:
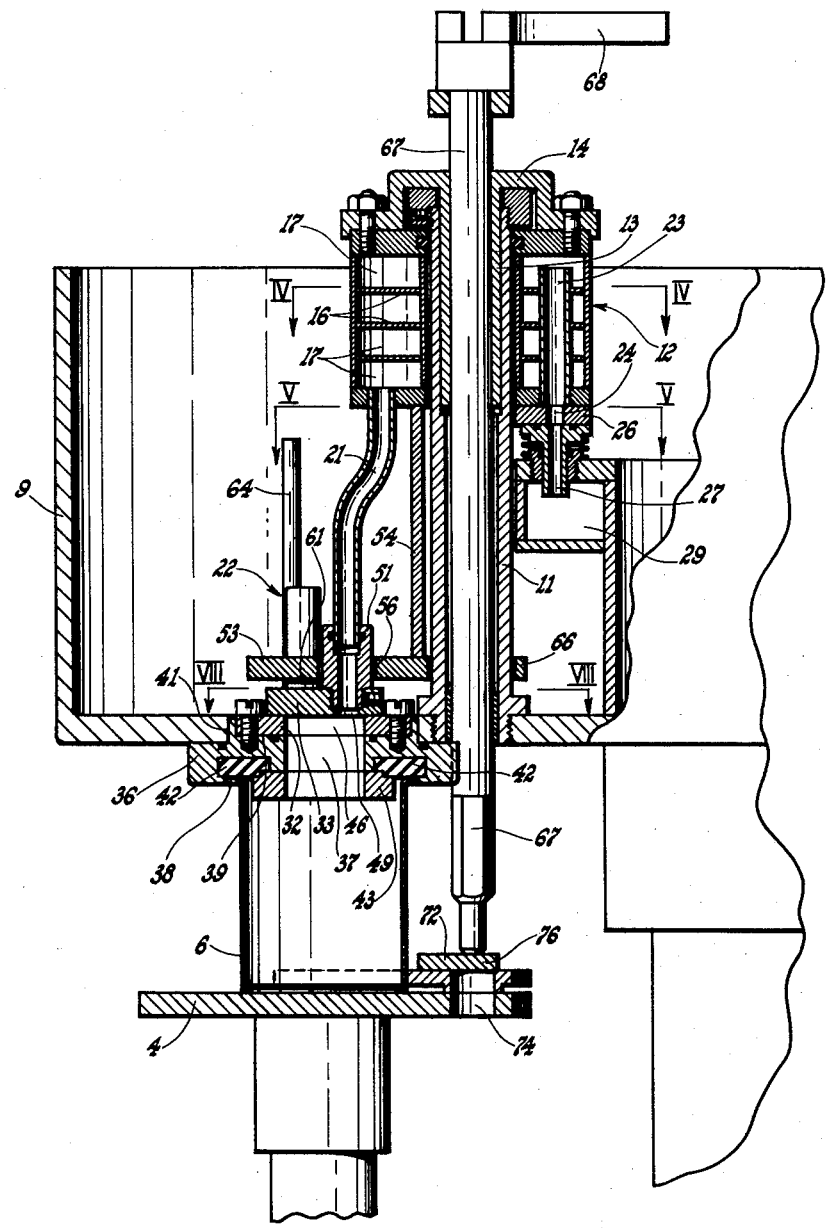
FIGURE 3 is a sectional elevation on an enlarged scale of one of the improved filling heads and adjacent parts of the vacuum syruping apparatus.

In accordance with the present invention each filling head 8 includes an upstanding supporting tube 11 screwed or otherwise connected to the bottom of the bowl through a hole therein as seen in FIGURE 3. These tubes are arranged in circumferentially spaced relationship within the bowl close to the upstanding side wall thereof.

Each upstanding tube is adapted to support on its upper end a liquid separator 12 which is of annular formation in plan and may be carried by a sleeve 13 located within or on the tube so that it may oscillate in relation thereto as hereinafter described. The sleeve may be fitted with a cap 14 to which the separator may be detachably connected as shown, for example, in FIGURE 3.

Each separator is divided internally by a series of vertically spaced annular plates or the like 16 adapted to form a series of vertically spaced annular compartments 17. Each compartment is provided with an upstanding transverse baffle 18 and a port 19 communicating with the adjacent compartment. These parts are preferably staggered in relation to their associated baffles as seen in FIG. 4 so as to baffle air as it enters each compartment in such a manner that its direction of flow is reversed in adjacent compartments. In other words, if the air in one compartment flows in a clockwise direction it is caused to flow in an anti-clockwise direction when it enters the adjacent compartment.

The lowermost compartment is provided with an air inlet port and an associated air inlet pipe 21 leading downwardly to a control valve assembly 22 for filling each can with syrup direct from the bowl. The uppermost compartment of each separator is provided with an outlet pipe 23 extending downwardly through the several compartments so as to communicate with an outlet port 24 in a part-circular valve plate 26 on the bottom of the separator.

This ported valve plate overlies and is slidably engaged by a vacuum valve 27 and a drain valve 28 (FIGURE 6) both of which are spring influenced and carried, for example, by a vacuum manifold 29 extending circumferentially around the inside wall of the bowl and connected in any suitable manner with a vacuum pump or the like (not shown). The vacuum valve communicates with the manifold and the drain valve is adapted to return liquid from the separator back to the bowl.

Each control valve assembly 22 is mounted upon the bottom of the bowl adjacent to its related upstanding tube 11. Each valve assembly includes fixed and movable valve members 32 and 33 respectively, the movable valve member being spring influenced as hereinafter described, towards the fixed valve member so that it may oscillate thereover.

The fixed and movable valve members may be carried by a valve supporting member 36 having an axial hole 37 therethrough and opposed recesses 38 and 39 respectively in the upper and lower faces of the supporting member which is adapted to fit within a hole 41 in the bowl bottom.

The lower recess 38 is adapted to receive a resilient sealing ring 42 and spacer 43 adapted to be engaged by the top of a can 6 in such a manner that the spacer which is of predetermined size will fit within the upper end portion of the can and thus provide a predetermined air space in the can after it has been filled with fruit and syrup.

The upper recess 39 is adapted to receive the fixed valve member 32 which may be of disc-like formation with a central port 46 therethrough. As seen in FIGURE 8, the latter is preferably in the form of a transverse slot the side walls of which diverge in such a manner that the cross sectional area of the slot progressively increases towards that end remote from the axis of its associated upstanding tube 11 about which the movable valve member is adapted to oscillate.

The movable valve member 33 is of plate-like formation and part circular or any other suitable shape in plan. It is also provided with a slot-like syrup inlet port 48 of substantially the same size as that of the port in the fixed valve member. These two ports are capable of being brought into registry. The movable valve member is also provided with a vacuum port 49 which is spaced at one side of the syrup inlet port and preferably fitted with an upstanding nipple 51 to which the aforesaid air inlet pipe 21 leading to the separator, is fitted. The movable valve member is also provided with a vent port 52 which is preferably located at that side of the syrup inlet port remote from the vacuum port.

Associated with the fixed and movable valve members is a swinging lever 53 which is carried by an arm 54 depending from the liquid separator 12 and provided with a hole 56 to accommodate the upstanding nipple 51 which thereby serves to transmit swinging movements of the lever to the movable valve member 33. The latter is also fitted with a pair of spaced upstanding pins 61 slidably accommodated in coaligned holes 62 in the swinging lever which also carries springs 63 adapted to engage the aforesaid pins and thus urge the movable valve member into close sliding engagement with its fixed valve member.

The swinging lever also carries an open ended vent pipe 64 the upper end of which projects above the highest level of the syrup in the bowl whilst the lower end of the pipe is connected to the vent port 52 in the movable valve member 33.

The swinging lever may also be provided with a hole 66 adjacent to its inner end so that it may form a loose fit over the associated upstanding tube 11 and thereby swing about the axis thereof.

The connection between each swinging lever 53 and the upstanding nipple on its movable valve member is also relatively loose so as to permit limited relative movement between these parts during their combined swinging movement in such a manner that slight lateral movement of the movable valve member 33 occurs during its oscillatory movements which has the effect of reducing to a minimum the possibility of the movable valve member wearing an undesirable clearly defined groove in the fixed valve member 32 which might lead to air leakage.

Figure 10:
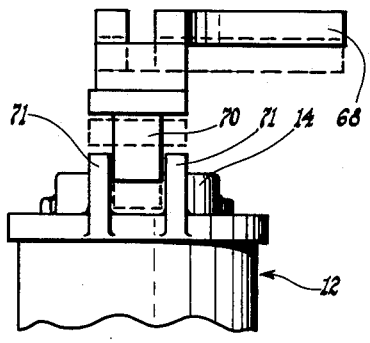
FIGURE 10 is a fragmentary side elevation showing part of a filler head and its associated striker arms forming part of the related no can, no fill mechanism.
Figure 11:
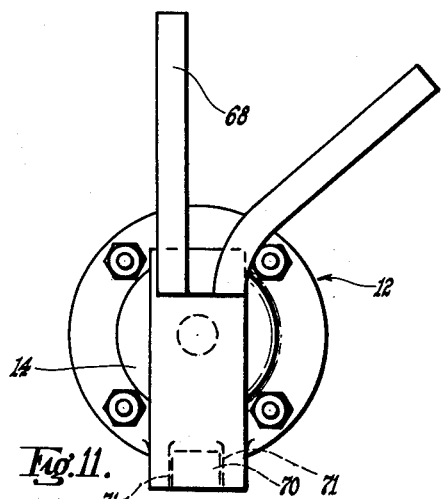
FIGURE 11 is a plan view of the parts seen in FIGURE 10.
Figure 12:
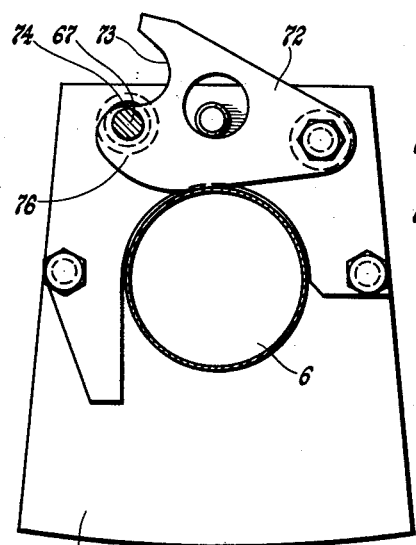
FIGURES 12 and 13 are plan views of a can platform showing parts of the related no can, no fill mechanism in its operative and inoperative positions respectively.

Associated with the foregoing are means for imparting the desired oscillation to each movable valve member and its related liquid separator. Such means which incorporate no can, no fill mechanism include a vertically slidable post 67 within each of the upstanding supporting tubes 11, each post being adapted to be engaged by one of the aforesaid can platforms 4. Each post is provided at its upper end with a slidable connection with the sleeve cap 14 carrying the related separator 12 and one or more striker arms 68 adapted to engage rollers 69, 69a or any other suitable abutments on the stationary frame. The sliding connection mentioned may consist of a laterally projecting finger 70 on the post which is slidably accommodated between a pair of upstanding cheeks 71 on the liquid separator or its supporting sleeve cap as seen more clearly in FIGURES 10 and 11. One of the striker arms may be longer than the other and curved lengthwise so as to engage its related rollers.

Figure 13:
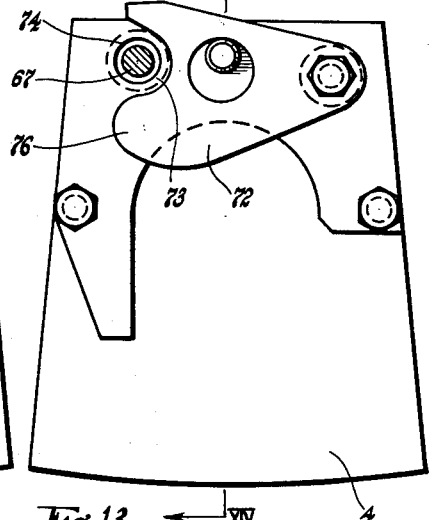
Figure 14:
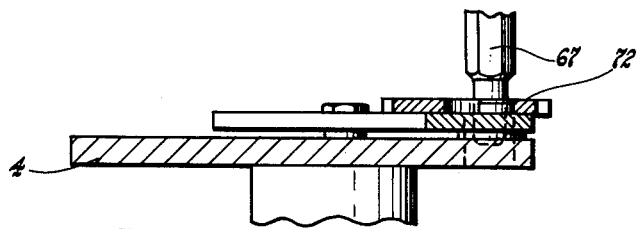
FIGURE 14 is a cross section taken on the line XIV—XIV of FIGURE 13.

The latter are spaced vertically on the stationary frame in circumferentially spaced relationship so that they will be engaged by the striker arms to oscillate the movable valve member of each filling head only if the post 67 carrying the striker arms is raised by its can platform. For this purpose, the latter may be provided with a spring influenced or cam actuated pivoted lever arm 72 having a gap 73 capable of being moved into and out of registry with the lower end of its related rod 67 and also with a hole 74 in its can platform. The arrangement is such that when a cam 6 is delivered to a platform 4 it engages the lever arm 72 and swings a lobe 76 thereon into alignment with the bottom of the rod 67 of its related filling head so that when the platform and its can are raised the rod is pushed upwardly so as to bring its striker arms 68 into registry with the aforesaid rollers. On the other hand, if for some reason a platform is not supplied with a can the related gap 73 and hole 74 are aligned beneath the associated rod 67 as in FIGURE 13 and, consequently, when the can platform is raised it does not lift the rod to actuate its related filling head.

In use, when each can 6 is subjected to vacuum filling and any syrup condensate or moisture is carried up into the separator 12, the baffles 16 therein function to separate such liquid from the outflowing air stream and during the return swinging movement of the separator it is returned through the drain valve 28 to the main bowl.

It will be appreciated from the foregoing that the improved filling heads 8 are devoid of the usual measuring chamber whilst, in addition, the no can, no fill mechanism does not include any springs which are likely to become defective or even break. The relatively large syrup inlet ports 46 employed ensure rapid filling of each can and reduce the possibility of undesirable foaming occurring to a minimum.

The provision of a separate liquid separator 12 for each filling head also ensures that any syrup condensate will be trapped and returned to the main bowl before reaching the vacuum manifold 29. The improved control valve assembly 22 is subjected to minimum relative movement with resultant reduction of wear. Furthermore, the control valve assembly may be quickly and easily disassembled for cleaning purposes.

Finally it should be appreciated that the improved apparatus is capable of operating efficiently at relatively high speeds of the order of from 400 to 600 cans per minute whilst the simplified no can, no fill mechanism is positive in action and most unlikely to get out of order.

Various alterations, modifications and/or additions may be introduced into the foregoing construction and arrangement of parts without departing from the ambit of the invention as defined by the appended claims.

Having now described my invention, what I claim as new and desire to secure by Letters Patent is:

1. Improved vacuum syruping apparatus of the kind comprising a stationary supporting structure having an upstanding central standard carrying mounting means for can filling mechanism located above a series of circumferentially spaced can platforms, the can filling mechanism and its series of can platforms being adapted to be rotated in relation to said supporting structure, elevating mechanism being provided for raising and lowering each platform during such rotary movement whereby each can on a platform is raised into engagement with a filling head forming part of said can filling mechanism which also includes a main supply bowl for syrup or other liquid and carries a series of said filling heads which are circumferentially spaced within the bowl with their associated vacuum and liquid control valve assemblies immersed in the liquid when it is in the bowl, and a vacuum pump for creating a partial vacuum in each can so as to cause liquid from the bowl to enter the can under atmospheric pressure, each filling head including an upstanding supporting tube connected to the bottom of said bowl through a hole therein and supporting on or adjacent to its upper end a liquid separator of annular formation in plan carried by a sleeve on said tube, each separator being provided internally with a series of vertically spaced annular plates forming a series of vertically spaced annular compartments each of which is provided with an upstanding transverse baffle and a port communicating with the adjacent compartment, the lowermost compartment having an air inlet port connected to an air inlet pipe leading to its associated control valve assembly, said uppermost compartment being provided with an outlet pipe extending downwardly to an outlet port in a valve plate on the bottom of said separator and which overlies and is slidably engaged by a vacuum valve and a drain valve, the vacuum valve communicating with a vacuum manifold communicating with said pump and the drain valve with said bowl, each control valve assembly being mounted upon the bottom of the bowl adjacent to its related upstanding tube and having fixed and movable valve members, the movable valve member being spring influenced towards its fixed valve member so as to oscillate thereover and means for imparting oscillatory movement to each movable valve member and which also functions as no can, no fill mechanism, the last mentioned mechanism including a vertical slidable post within its associated upstanding tube and which is adapted for detachable connection to its liquid separator, each post being provided at or adjacent to its upper end with one or more striker arms adapted to engage rollers or abutments on said stationary structure and means on each can platform for raising and lowering its longitudinally slidable post only when a can is carried by said platform.

2. Improved vacuum syruping apparatus for filling containers with syrup or other liquid, comprising a main supply bowl for syrup carrying a series of circumferentially spaced filling heads located within the bowl so as to project through the bottom thereof, each filling head having an associated vacuum and liquid control valve assembly immersed in the syrup when the latter is contained in the bowl, said bowl being positioned above a series of circumferentially spaced platforms adapted to receive the containers to be filled, a vacuum pump for creating a partial vacuum in each container so as to cause liquid from the bowl to enter the container under atmospheric pressure, each filling head having means for automatically closing a vacuum passage in said valve assembly prior to admitting the liquid to a container, each filling head having an independent liquid separator associated therewith for trapping any liquid that may be entrained in the out-flowing air stream passing to said vacuum pump, each liquid separator being of annular form in plan and divided internally by a series of vertically spaced annular plates forming a series of vertically spaced annular compartments therein, each of said compartments being provided with an upstanding transverse baffle and a port communicating with the adjacent compartment, the lowermost compartment being provided with an outlet port in the bottom of the separator and an air inlet port communicating with an air inlet conduit leading to said control valve assembly, the uppermost compartment being provided with an outlet pipe extending downwardly and communicating with said outlet port, a vacuum valve and a drain valve associated with said outlet port, said outlet port extending through a valve plate attached to the bottom of the separator, said valve plate overlying and being slidably engaged by said vacuum valve and said drain valve, spring means urging both said vacuum valve and said drain valve against said valve plate, a vacuum manifold on said bowl supporting said spring means and connected to said vacuum pump, said vacuum valve communicating with said manifold and said drain valve communicating with said bowl to return liquid trapped in the separator back to the bowl.

3. Apparatus according to claim 2 wherein said ports in the annular plates are staggered in relation to their associated baffles in such a manner that if the air entering one compartment flows in a clockwise direction it is caused to flow in the opposite direction when it enters the adjacent compartment.

4. Improved vacuum syruping apparatus for filling containers with syrup or other liquid, comprising a main supply bowl for syrup carrying a series of circumferentially spaced filling heads located within the bowl so as to project through the bottom thereof, each filling head having an associated vacuum and liquid control valve assembly immersed in the syrup when the latter is contained in the bowl, said bowl being positioned above a series of circumferentially spaced platforms adapted to receive the containers to be filled, a vacuum pump for creating a partial vacuum in each container so as to cause liquid from the bowl to enter the container under atmospheric pressure, each filling head having means for automatically closing a vacuum passage in said valve assembly prior to admitting the liquid to a container, each filling head having an independent liquid separator associated therewith for trapping any liquid that may be entrained in the outflowing air stream passing to said vacuum pump, each said control valve assembly being mounted upon the bottom of said bowl beneath its associated liquid separator and including fixed and movable valve members arranged in superimposed relationship with the fixed valve member in registry with an opening in the bottom of the bowl and the movable valve member spring biased towards the fixed valve member and capable of oscillatory movement thereover, said fixed and movable valve members being carried by and forming a unit with a valve supporting member having an axial hole therethrough and being detachably secured within said opening in the bowl bottom, a swinging lever for each control valve assembly carried by its respective liquid separator, an upstanding nipple on said movable valve member connected to its liquid separator, said swinging lever having an opening accommodating said nipple and spring means pressing said movable valve member downwardly against its associated fixed valve member, said swinging lever also carrying an open ended vent pipe the upper end of which projects above the highest level of syrup contained in the bowl.

5. Apparatus according to claim 4 wherein each filling head is mounted upon an upstanding support tube connected to the bottom of the bowl through a hole therein, said tubes being arranged in circumferentially spaced relationship within the bowl, each said liquid separator being journaled upon its upstanding tube and capable of oscillating freely thereon, and said swinging lever having an opening adjacent to its inner end in which is loosely fitted its associated upstanding tube and being swingably mounted with its liquid separator about the axis of said tube.

6. Apparatus according to claim 4 wherein said opening in each swinging lever accommodating said upstanding nipple is relatively large so as to permit limited relative movement between said swinging lever and its movable valve member in such a manner that slight lateral movement of said movable valve member may occur during its oscillatory movements over said fixed valve member, whereby to reduce to a minimum the possibility of the movable valve member wearing an undesirable clearly defined groove in said fixed valve member.

7. Apparatus according to claim 5 wherein is further provided means for imparting the desired oscillatory movement to each movable valve member and its related liquid separator, said means including a post located within its associated upstanding support tube, each said post being provided at its upper end with one or more striker arms adapted to be engaged by circumferentially spaced abutments, one of said striker arms being adapted to partially turn said post in one direction while the other striker arm is adapted to return the post to its original operative position, said post being operatively connected to said liquid separator.

8. Apparatus according to claim 7 wherein said means for oscillating each movable valve member also includes a container, no fill mechanism, each said post being vertically slidable as well as oscillatable within its supporting tube and being detachably connected to its associated liquid separator.

9. Apparatus according to claim 8 wherein said detachable connection between each post and its liquid separator includes a laterally projecting finger on said post slidably accommodated between a pair of upstanding cheeks on said liquid separator, and means for selectively raising and lowering said post as a result of upward and downward movement of the related container platform.

10. Apparatus according to claim 9 wherein said means for selectively raising and lowering said post as a result of upward and downward movement of the related container platform is arranged to raise its associated slidable post only if the platform carries a container to be filled, each said platform being provided with a pivoted lever arm having a gap which is movable into and out of registry with the lower end of said slidable post and also with a hole in the associated container platform, the arrangement being such that a container delivered on a platform engages said pivoted lever arm and swings the arm under the bottom of said rod so that when the platform and its container are raised the post is pushed upwardly to bring its striker arms into registry with said abutments, but if the platform is not supplied with a container the related gap and hole in the pivoted lever arm and platform respectively are aligned beneath the associated post so that when the platform is raised neither the platform nor the lever arms lifts the post to actuate the related filling head.

11. Improved vacuum syruping apparatus for filling containers with syrup or other liquid, comprising a main supply bowl for syrup carrying a series of circumferentially spaced filling heads located within the bowl so as to project through the bottom thereof, each filling head having an associated vacuum and liquid control valve assembly immersed in the syrup when the latter is contained in the bowl, said bowl being positioned above a series of circumferentially spaced platforms adapted to receive the containers to be filled, a vacuum pump for creating a partial vacuum in each container so as to cause liquid from the bowl to enter the container under atmospheric pressure, each filling head having means for automatically closing a vacuum pasage in said valve assembly prior to admitting the liquid to a container, each filling head having an independent liquid separator associated therewith for trapping any liquid that may be entrained in the outflowing air stream passing to said vacuum pump, each liquid separator being divided internally by a series of baffles to form a series of communicating compartments, the last of said compartments being provided with an outlet port and an air inlet port communicating with an air inlet conduit leading to said control valve assembly, the first of said compartments having an outlet pipe connected to said outlet port, a vacuum valve and a drain valve associated with said outlet port, said outlet port extending through a valve plate attached to the separator, said valve plate being slidably engaged by said vacuum valve and said drain valve, spring means urging both said vacuum valve and said drain valve against said valve plate, a vacuum manifold on said bowl connected to said vacuum pump, said vacuum valve communicating with said manifold and said drain valve communicating with said bowl to return liquid trapped in the separator back to the bowl.

References Cited in the file of this patent
UNITED STATES PATENTS

| | | |
|---|---|---|
| 1,316,330 | Modlin | Sept. 16, 1919 |
| 2,196,096 | Broadhurst | Apr. 2, 1940 |
| 2,546,418 | Andron et al. | Mar. 27, 1951 |
| 2,643,807 | Gialanella | June 30, 1953 |
| 2,706,589 | Bingham | Apr. 19, 1955 |